May 28, 1968　　　R. H. CARLSON　　　3,384,911

METHOD OF MAKING SERRATED-HEAD BLANKS FOR FASTENERS

Original Filed Feb. 7, 1966

RAYMOND H. CARLSON
INVENTOR

BY
BUCKHORN, BLORE, KLARQUIST & SPARKMAN
ATTORNEYS 3,384,911
METHOD OF MAKING SERRATED-HEAD BLANKS FOR FASTENERS
Raymond H. Carlson, Rockford, Ill., assignor to Textron Industries, Inc., Rockford, Ill., a corporation of Delaware
Original application Feb. 7, 1966, Ser. No. 525,564, now Patent No. 3,352,190. Divided and this application July 6, 1967, Ser. No. 651,474
2 Claims. (Cl. 10—10)

ABSTRACT OF THE DISCLOSURE

A headed blank for a threaded fastener is made by first providing a cylindrical metal blank of a diameter substantially equal to the pitch diameter of the fastener thread. A head is formed on the end of the blank with a single blow during which the end of the blank is reversely extruded and simultaneously there are formed a multiplicity of alternating, convexly curved ribs and intermediate, concavely curved flutes. The flow of metal is so controlled during the punch blow that no substantial lateral flow of metal occurs during the extrusion step so that the maximum diameter across diametrically opposed ribs is maintained substantially equal to the original diameter of the workpiece blank while a minimum diameter between diametrically opposed flutes is maintained slightly larger than the root diameter of the thread. The ribs are work-hardened during the extrusion of the head to enhance the strength thereof and at the end of the punch blow a portion of the blank metal is upset to form an enlarged washer flange between the shank portion and the ribbed head portion.

Cross-reference to related application

This application is a division of co-pending application Ser. No. 525,564 filed Feb. 7, 1966, entitled "Serrated-Head Fastener and Method of Making Same," now Patent No. 3,352,190.

Background of the invention

Serrated-head fasteners are well known. The heads of such fasteners, however, have heretofore been made with sharply pointed V-shaped serrations which are incapable of developing a large amount of torque, and thus the heads have had to have a major diameter considerably larger than the pitch diameter of the shank in order to deliver enough torque fully to utilize the thread thereon. This, of course, has resulted in a heavy fastener, and one which is uneconomical to manufacture because of the excess material consumed. Furthermore, serrated-head fastener blanks have heretofore required at least two steps in order to make them, the step of first forming an enlarged head or bloom on the workpiece, and then the step of forming serrations on this enlarged head. In a punch and die operation, this has always required at least two blows.

Summary of the invention

The method of my invention comprises the steps of preparing a cylindrical blank workpiece of constant diameter which is substantially equal to the pitch diameter of the threaded shank of the finished product, enclosing the workpiece in the cavity of a holding die of a cold heading machine and with a portion of the workpiece protruding therefrom, and striking the protruding portion of the workpiece a single blow with a heading punch. The punch blow is directed toward the protruding end portion of the blank and in a direction axially of such blank. During the punch blow, the metal of the blank end portion is controlled against any substantial lateral outward flow and instead the metal is caused to flow in a direction opposite to the direction of movement of the punch whereby a multiplicity of alternating, convexly curved ribs and intermediate, concavely curved flutes are formed on the blank end portion. Because the metal is controlled against any substantially outward flow, the maximum diameter across diametrically opposed ribs is maintained substantially equal to the original diameter of the workpiece blank. The metal flow is further so controlled during the extrusion punch blow that the minimum diameter between diametrically opposed flutes is maintained slightly larger than the root diameter of the thread of the finished product. Toward the end of the punch blow, further extrusion of the head in the punch is restrained and as the punch blow is continued, a quantity of metal of the end portion of the blank is then upset without lateral restraint to form an enlarged washer flange between the ribbed head portion and the remainder of the workpiece blank, the upper and lower surfaces of the washer being substantially parallel to each other, and a conical shoulder is formed between the upper surface and the rib surface of the head.

It is a principal object of the present invention, therefore, to provide in a single punch blow a serrated head fastener blank of the class described with high strength ribs of predetermined minimum and maximum transverse diameters and at the same time form a flat washer portion between the ribbed head and the remainder of the blank.

Other objects and advantages of the invention will become apparent from the following specification when taken in conjunction with the accompanying drawings.

Figure 1:
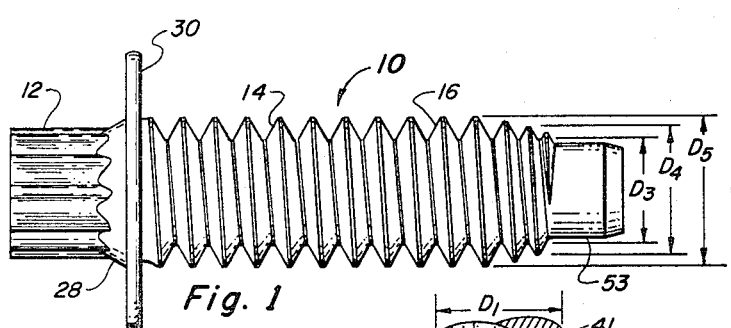
FIG. 1 is an elevational view of a serrated-head fastener made in accordance with this invention.
Figure 2:
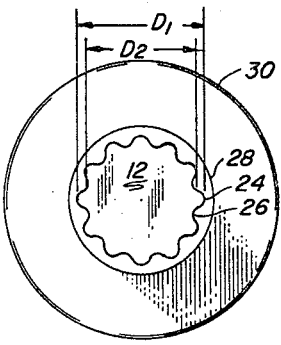
FIG. 2 is an end view of the head of the fastener of FIG. 1.

Referring to the drawings and in particular to FIGS. 1 and 2, there is shown a serrated-head fastener 10 having an externally serrated head 12 and an elongated threaded shank 14. The head 12 has a major diameter $D_1$ substantially equal to the pitch diameter $D_4$ of the threaded shank 14, and therefore somewhat less than the crest diameter $D_5$ of the thread. The minor diameter $D_2$ of the serrated head 12 is greater than the root diameter $D_3$ of the threaded shank 14. The pitch diameter $D_4$ of the threaded shank 14, of course, is substantially equal to the diameter $D_6$ of the workpiece 20 on which the threads 16 are formed. (See FIG. 3.)

As will be seen from FIG. 2, the peripheral surface of the serrated head 12 is comprised of a series of alternating, arcuate, convex ribs 24 and arcuate, concave flutes which are equally spaced and tangentially merge with each other about the peripheral surface of the head 12. The convex ribs 24 and concave flutes 26 terminate in a sloping, conical shoulder 28. A relatively thin integral washer 30 is formed between the shoulder 28 and the shank 14. The serrated head 12 thus formed is capable of delivering a sufficient amount of torque with a complementary wrench to obtain maximum loading of the threaded portion despite the fact that the head 12 is considerably smaller than has heretofore been deemed necessary.

Figure 6:
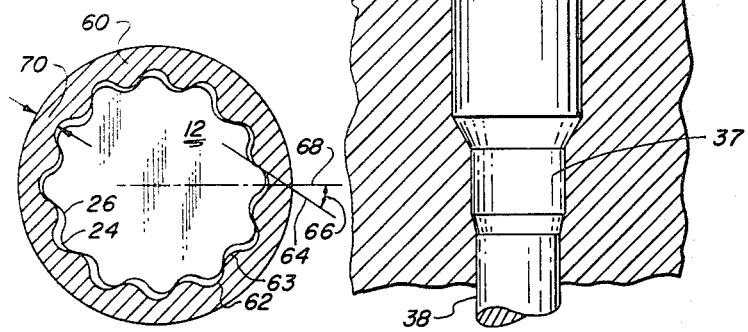
FIG. 6 is a plan view, partly in section, showing the end view of the fastener head and the cross section of a surrounding socket wrench.

Referring now to the view of FIG. 6, the shell of a socket wrench is indicated in cross section at 60 surrounding the serrated head 12. The internal wall of the socket wrench is shown having alternating concave flutes 62 and convex ribs 63 which are generally complementary to the ribs 24 and flutes 26 of the head 12. For purposes of illustration, considerable clearance is shown between the adjacent ribs of the head and wrench, respectively, but it will be observed that the engaging surfaces of these ribs extend substantially in a plane 64 which forms an angle 66 of approximately 33 degrees with the radii 68.

In the case of conventional serrated head and complementary wrench combinations, in which the serrations are defined by relatively flat intersecting surfaces, the drive angle comparable to that indicated at 66 in FIG. 6 is much greater, such as in excess of 60 degrees. Such a large drive angle imposes a severe load upon the wrench which, accordingly, must be designed with sufficient wall thickness to withstand the stress imposed thereupon. With a reduced drive angle such as indicated herein, the thickness of the wall of the socket wrench indicated at 70 may be reduced very substantially. Moreover, on account of the fact that the bottoms of the flutes formed in the socket are rounded, high stress zones, such as are caused by V-bottom grooves, are eliminated.

Therefore, even though the overall diameter $D_1$ of the screw head is much less than in screws heretofore customarily provided, more than adequate torque can be provided by a thin walled socket wrench with less danger of failure of the screw head or the wrench than in the case of conventional serrated-head types of screw and wrench combinations.

Particular attention is further directed to the fact that the root diameter $D_3$ of the thread of the shank 14 is somewhat less than the diameter $D_2$ across the bottoms of the grooves of the screw head 12, and any failure in connection with the screw will occur across the roots of the threaded portion of the screw rather than in the screw head.

Figure 3:
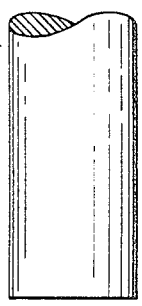
FIG. 3 is an elevational view of the initial workpiece from which the fastener of FIG. 1 is made.

The serrated-head blank for the fastener 10 of FIGS. 1 and 2 is produced in the following manner in accordance with the method of this invention. A cylindrical workpiece 20 of substantially constant diameter $D_6$, such as is shown in FIG. 3, and of predetermined length is severed from a length of stock material (not shown). The diameter $D_6$ is desirably that of the shank 14 prior to threading, so that the diameter of the workpiece will be substantially equal to the pitch diameter $D_4$ of the threaded shank 14, as will be well known to those skilled in the art. Preferably, the volume of the workpiece 20 is made substantially equal to the volume of the fastener 10.

After severing the workpiece 20, it is placed in the cavity 32 of a holding die 34 of a heading machine (not shown) with a portion 36 of the workpiece protruding from the die.

Positioned above the die 34 is a punch 40, which has an interior cavity 42 formed in a manner to shape the head 12. As such, the periphery of the cavity 42 comprises a series of alternating, arcuately curved, convex ribs and concave flutes equally spaced and tangentially joined to each other. The major diameter of the cavity 42 is, of course, equal to the major diameter $D_1$ of the head 12 and is substantially equal to the diameter $D_6$ of the workpiece 20. The minor diameter of the cavity 42 is, of course, made equal to the minor diameter $D_2$ of the serrated head 12, and is thus slightly less than the diameter of the workpiece 20. A single stroke of the punch 40 will thus form the finished head 12 on the protruding portion 36 of the workpiece.

The cavity 42 of the punch 40 is provided with an outwardly flared entrance 44 to facilitate the passage of the punch 40 over the protruding portion 36.

In view of the fact that the major diameter of the cavity 42, that is, as measured between the bottoms of diametrically opposite grooves, is substantially equal to the diameter $D_6$ of the workpiece, the end portion of the workpiece will be extruded upwardly into the cavity 42 until it engages the end of the knockout pin 41. The convex ribs 24 and flutes 26 will be fully and accurately formed because the flow of metal is so controlled by the punch 40 that little or no outward flow of metal occurs during the perfect formation of such ribs, while at the same time the ribs will be work-hardened due to the extrusion which takes place. The metal displaced particularly during the formation of the flutes flows lengthwise of the blank in the direction opposite to the direction of movement of the punch. During this upward extrusion of the end portion of the workpiece 36, little or no lateral flow of the workpiece metal takes place between the end of the punch 40 and the upper surface of the holding die 34. The end surface of the knockout pin forms the bottom of the punch cavity 42 and serves to restrain further extrusion of the blank end portion 36 in the punch cavity and also facilitates the withdrawal of the punch 40 from the end of the workpiece following the formation of the head 12.

Figure 4:
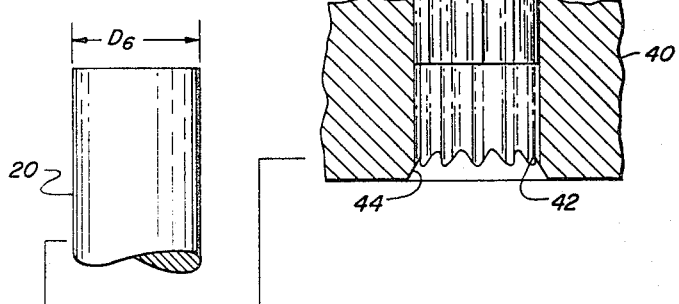
FIG. 4 is a sectional view showing the die with the workpiece placed therein and the punch in position to strike the head-forming blow.
Figure 5:
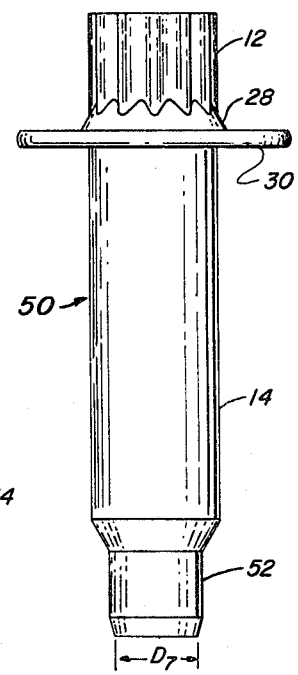
FIG. 5 is an elevational view of the fastener blank of the present invention after the head has been formed thereon and prior to forming the thread.

The fact that the ribs 24 are formed by an extrusion operation, rather than being formed by a broaching operation contributes materially to the strength thereof, thereby enabling the reduction in the overall size of the head to the present minimum. During the continued downward movement of the punch 40, as viewed in FIG. 4, washer 30 is formed, the metal needed for the washer coming from an additional length of workpiece specifically provided for that purpose. In other words, the punch 40 also upsets a portion of the workpiece without any lateral restraint during such upsetting between the lower surface of the punch 40 and the upper surface of the die 34, as viewed in FIG. 4, sufficient to form the washer 30. Since reduction of weight of the finished article to a minimum without impairment of strength or utility is one of the objects of the present invention, the washer 30 is preferably made relatively thin and flat. As viewed in FIG. 5, the upper surface of the washer 30 is parallel to the lower surface over the greater part of the outward or radial extent of the washer from the base of the serrated head and has an outside diameter substantially twice that of the head 12. The serrated head 12, the fillet 28, and the integral washer 30 are thus formed by means of a single stroke of the punch, the funnel-shaped opening 44 forming the fillet 28 as the opening guides the punch down onto the protruding portion 36. The fastener blank 50 thus formed is shown in FIG. 5, the shank 14 being readily adapted for the thread 16 to be rolled thereon.

If desired, the blank 50 may be provided with a lead point, such as is illustrated at 52. Such a lead point sometimes facilitates the assembly of the fastener and is illustrated in the finished screw in FIG. 1 at 53. The diameter $D_7$ of the lead point 52 is preferably no greater than the root diameter $D_3$ of the thread provided on the shank. Such a lead point can be formed on the blank during the heading operation, the bottom of the cavity in the die 34 being provided with a correspondingly reduced diameter extension 37. The die 34 is also shown being provided with a knockout pin 38, the end of which serves as a bottom wall of the cavity extension 37.

While I have described my invention with respect to the method of manufacturing one particular embodiment, it is of course to be understood that the invention permits numerous modifications in arrangement and detail. I therefore claim as my invention all such modifications which come within the true spirit and scope of the following appended claims.

What is claimed is:

1. The method of making a headed blank for a threaded fastener device comprising the steps of:

(a) providing a cylindrical, metal workpiece blank of a diameter substantially equal to the pitch diameter of the fastener thread;

(b) inserting said blank into a holding die of a heading machine with an end portion of said blank protruding therefrom;

(c) with a single punch blow directed in an axial direction relatively toward said end portion, first forming a multiplicity of external alternating, convexly curved ribs and intermediate, concavely curved flutes by causing the metal of said end portion which is displaced by the formation of said flutes to flow lengthwise of said blank in the direction reverse to the direction of said punch blow whereby said ribs are work-hardened by longitudinal extrusion;

(d) during said punch blow, controlling the flow of metal against any substantial lateral outward flow in said ribbed and fluted portion of said head and in the remaining portion of said blank and providing thereon a maximum diameter across diametrically opposed ribs substantially equal to the original diameter of the workpiece blank and a minimum diameter between diametrically opposed flutes slightly larger than the root diameter of said thread; and (e) at the end portion of said single punch blow, upsetting the metal of the workpiece blank between the ribbed and fluted end portion and the upper surface of the holding die to form an enlarged washer flange between said ribbed and fluted portions and the remainder of said workpiece blank, the metal being laterally unrestrained between the facing surfaces of said punch and said holding die during said upsetting.

2. The method of claim 1 in which:

(a) the extrusion of metal during the punch blow is limited to a predetermined amount and at the end portion of the punch blow causing the metal to flow radially outwardly from the metal blank thereby to form an enlarged washer flange between the ribbed head portion and the remainder of said blank, said washer flange having parallel upper and lower surfaces;

(b) the flow of metal being further so controlled during the last-mentioned punch blow portion so as to form a conical shoulder between said upper surface and the ribbed head portion of said blank.

References Cited
UNITED STATES PATENTS

| | | | |
|---|---|---|---|
| 2,083,092 | 6/1937 | Richer | 10—10 XR |
| 2,939,160 | 6/1960 | Mitchell | 10—27 XR |
| 3,088,140 | 5/1963 | Carlson | 10—27 |

LEONIDAS VLACHOS, *Primary Examiner.*